United States Patent [19]

Kamitsuma et al.

[11] Patent Number: 5,478,220
[45] Date of Patent: Dec. 26, 1995

[54] COMPRESSOR SCROLL MADE OF SILICON CONTAINING ALUMINUM ALLOY

[75] Inventors: Yasuo Kamitsuma, Mito; Yusaku Nakagawa; Mitsuo Chigasaki, both of Hitachi; Tadashi Iizuka, Ashikaga; Kooichi Inaba, Tochigi; Keiichi Nakamura, Tokyo; Masaki Minabe; Tsuyoshi Kagaya, both of Matsudo, all of Japan

[73] Assignees: Hitachi, Ltd., Tokyo; Hitachi Powdered Metals Co., Ltd., Chiba, both of Japan

[21] Appl. No.: 310,991

[22] Filed: Sep. 23, 1994

Related U.S. Application Data

[62] Division of Ser. No. 865,264, Apr. 8, 1992, Pat. No. 5,387,272.

[30] Foreign Application Priority Data

Apr. 12, 1991 [JP] Japan .................. 3-079643

[51] Int. Cl.[6] ...................................... F04C 18/04
[52] U.S. Cl. ........................... 418/55.2; 418/179
[58] Field of Search ................... 418/55.2, 179; 29/888.022; 75/249

[56] References Cited

U.S. PATENT DOCUMENTS

| | | | |
|---|---|---|---|
| 4,696,084 | 9/1987 | Hirano et al. | 29/888.022 |
| 4,838,936 | 6/1989 | Akechi | 75/249 |
| 4,908,077 | 3/1990 | Nakamura et al. | 148/437 |
| 5,292,358 | 3/1994 | Miura et al. | 75/249 |

FOREIGN PATENT DOCUMENTS

| | | | |
|---|---|---|---|
| 57-47801 | 3/1982 | Japan | 75/249 |
| 57-57855 | 4/1982 | Japan | 75/249 |
| 58-126492 | 7/1983 | Japan | 418/55.2 |
| 59-63389 | 4/1984 | Japan | 418/55.2 |
| 60-98186 | 6/1985 | Japan | 418/55.2 |
| 2277992 | 11/1990 | Japan | 448/179 |

*Primary Examiner*—John J. Vrablik
*Attorney, Agent, or Firm*—Antonelli, Terry, Stout & Kraus

[57] ABSTRACT

The present invention provides an Al—Si based sintered alloy of high strength and high ductility, a method for production thereof and use thereof. The alloy comprises 1–45% of Si, 0.1–20% of an element of Group IIIa, 0.01–5% of at least one element of Groups IVa and Va, the balance of substantially Al. This alloy can further contain at least one of 0.01–5% of Cu, 0.01–5% of Mg, 2.0% or less of Fe, 1.5% or less of Mn and 1.5% or less of Co and the oxygen content is reduced to 0.15% or less by sintering under vacuum. The present invention is applied to automobile parts such as a piston and scroll compressors. The alloy has a tensile strength of about 40 kg/mm$^2$ or higher and an elongation of 1.5% or more at 150° C.

2 Claims, 6 Drawing Sheets

COMPRESSOR SCROLL MADE OF SILICON CONTAINING ALUMINUM ALLOY

This application is a Divisional application of application Ser. No. 865,264, filed Apr. 8, 1992, now U.S. Pat. No. 5,387,272.

BACKGROUND OF THE INVENTION

The present invention relates to a novel sintered Al alloy of high strength and wear resistance and in particular to a sintered aluminum-silicon based alloy which improves damage and wear resistance and plastic workability and machinability of opposite materials to be worked, and a method for producing the alloy and uses of the alloy.

Hitherto, AC8A and A390 specified in JIS have been produced as wear resistant Al alloys by a melt casting method. However, an Al—Si based alloy high in Si content is difficult to produce by the melt casting method. That is, when the Si content is more than that forms a eutectoid, there are such defects that coarse proeutectic Si crystal is precipitated to cause reduction of strength and besides difficulty in plastic workability and moreover, the opposite materials to be worked may be damaged by the hard and coarse proeutectic Si crystals. Especially, now miniaturization and weight-saving and high-performance of products are desired and so improvements in strength, plastic workability, cutting workability and wear resistance have been required.

Thus, recently, Al—Si—Fe, Al—Si—Mn and Al—Si—Ni based sintered alloys have been developed using powder metallurgy technique. A method for production of these alloy powders comprises melting an alloy of a given composition, making quenched and solidified powders by gas atomization or the like, compacting the powders and then sintering or hot plastic working the compacting to produce the desired alloy. The quenched and solidified powders contain finely divided and uniformly dispersed proeutectic Si crystals and hence obtained is a high Si material higher in strength than those made by conventional melt casting method.

The sintered alloys of Japanese Patent Kokai (Laid-Open) Nos. 64-56806 and 63-183148 produced by a quenched and solidified powder-sintering method have high strength, but are very low in toughness, which is about 0.2–0.98 kg-m/cm$^2$ in Charpy impact strength. Japanese Patent Kokai No. 60-131944 discloses a mixture of quenched and solidified Al alloy powders and 0.5–10 vol % of carbon powders, in which high strength cannot be obtained.

In Japanese Patent Kokai No. 55-97447, graphite, sulfides and fluorides are added as solid lubricating components and so high strength cannot be expected as in Japanese Patent Kokai No. 60-131944.

Furthermore, Japanese Patent Koaki Nos. 63-183148, 1-159345, 2-61023, 2-61024 and 2-70036 disclose to produce alloys by compacting alloy powders containing 5–40% of Si and Cu, Mg, Mn, Fe, W, Ni, Cr, Co, Ce, Ti, Zr, V, Mo and the like and then subjecting the compacted alloy to hot plastic working, but the resulting alloys do not have a sufficient strength and toughness.

As explained above, the conventional Al—Si—Fe, Al—Si—Mn, and Al—Si—Ni based sintered alloys are high in strength, but low in toughness. Further, the sintered Al alloys containing solid lubricants are also considerably low in strength and toughness. Therefore, they have a limit in use as members to which impact force is repeatedly applied and as sliding wear members used under high loading.

SUMMARY OF THE INVENTION

The object of the present invention is to provide sintered Al alloys having a high strength and high toughness, a method for producing them, and various uses thereof.

DESCRIPTION OF THE INVENTION

Figure 1:
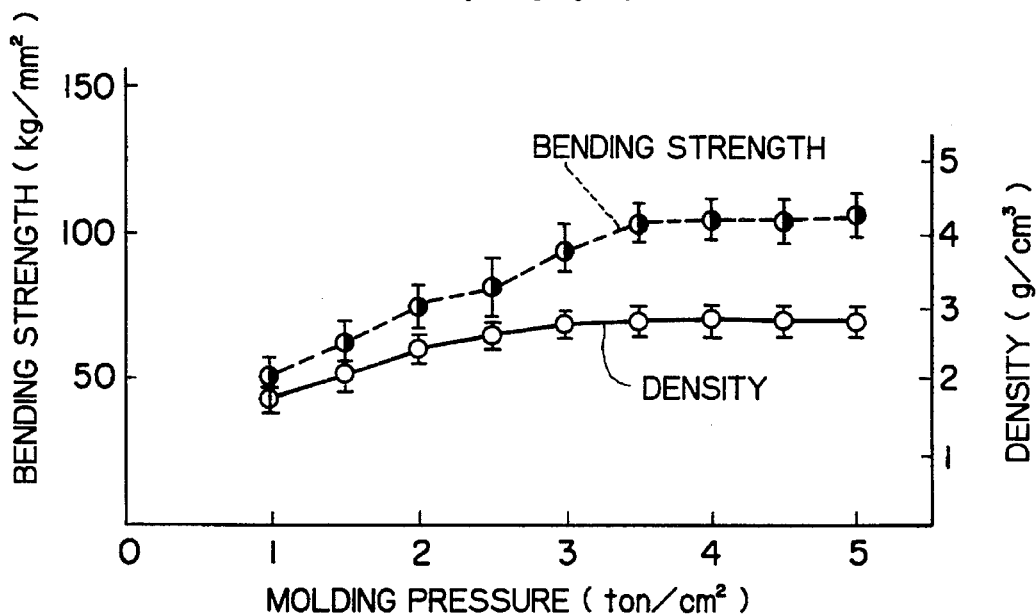
FIG. 1 is a graph which shows relations between compacting pressure and bending strength and density for the alloy of the present invention.

The present invention relates to a highly ductile sintered Al alloy, which comprises by comprising, by weight, 1–45% of Si, 0.1–20% of an element of Group IIIa, 0.01–5% of at least one element of Groups IVa and Va and the balance of substantially Al.

In the present invention, the alloy may additionally contain 0.1–5% of Cu and 0.1–5% of Mg and may further contain at least one of 2.0% or less of Fe, 1.5% or less of Mn and 1.5% or less of Co.

Furthermore, the present invention relates to a highly ductile sintered Al alloy, which comprises, by weight, 0.1–20% of an element of Group IIIa, 0.01–5% of at least one element of Groups IVa and Va, 0.15 or less of oxygen and the balance of substantially Al. This alloy as a base may contain 1–45% of Si and in addition may contain 5% or less of Mg, 10% or less of Cu, 20% or less of Fe, 10% or less of Mn, 8% or less of Co, 5% or less of W, and 5% or less of Mo. A less content of oxygen brings about improvement of ductility, but a content of 5 ppm or more is preferred from the point of strength. A silicon content of 50–500 ppm which can provide a high strength and ductility is preferred.

The present invention also relates to a highly ductile sintered Al alloy, which comprises, by weight, Si in an amount of from that forming a hyper-eutectoid to 45%, the number of Si particles having a particle size of 1 μm or less being 50–80%, that of Si particles having a particle size of more than 1 μm and 2.5 μm or less being 15–35%, that of Si particles having a particle size of more than 2.5 μm and 5 μm or less being 5–20% and that of Si particles having a particle size of more than 5 μm being 5% or less based on the total Si particles and the balance of substantially Al. This alloy as a base may contain 0.1–20% of an element of Group IIIa and 0.01–2% of at least one element of Groups IVa and Va and further may contain at least one of 5% or less of Mg, 10% or less of Cu, 20% or less of Fe, 10% or less of Mn, 8% or less of Co, 5% or less of W and 5% or less of Mo.

The present invention relates to a method of producing a highly ductile sintered Al alloy, which comprises the steps of sintering a compact of alloy powders comprising, by weight, 1–45% of Si, 0.1–20% of an element of Group IIIa and the balance of substantially Al in a non-oxidizing atmosphere of $2 \times 10^{-3}$ mmHg or lower at a partial pressure of oxygen. It is preferred to carry out the sintering step in the above method under a high vacuum of $10^{-2}$ mmHg or lower. The sintering method of the present invention can be applied to all of the alloys and can obtain a sintered body of a very low oxygen content.

The present invention relates to a method of producing a highly ductile sintered Al alloy, which comprises the steps of subjecting a compact of alloy powders comprising, by weight, 1–45% of Si, 0.1–20% of an element of Group IIIa and the balance of substantially Al to the high-temperature vacuum degassing treatment at a pressure of $10^{-2}$ mmHg or lower at a temperature of 350° C. or higher and then to the sintering and/or hot plastic working in a non-oxidizing atmosphere. The vacuum sintering as mentioned above can be combined with this method as a basic method and further this method can also be applied to the production of various alloys.

The present invention relates to a method of producing a highly ductile sintered Al alloy, which comprises the steps of sintering a compact of alloy powders comprising, by weight, 1–45% of Si, 0.1–20% of an element of Group IIIa, 0.1–5% of Cu, 0.1–5% of Mg and the balance of substantially Al under vacuum, subjecting the sintered compact to the high-temperature plastic working, then solution treatment and ageing treatment.

The alloy composition of the present invention can be used as it is sintered or as it is sintered and then subjected to the hot plastic working, or can be used after subjected to the steps of subsequent solution treatment and ageing treatment where Si particles and particles of an intermetallic compound are formed. The Si particles are precipitated in a eutectic form in the hypo-eutectic composition and in a pro-eutectic form and eutectic form in the hyper-eutectic composition.

The present invention relates to Al alloy powders which comprise, by weight, 1–45% of Si, 0.1–20% of an element of Group IIIa, 0.01–2% of at least one element of Groups IVa and Va and the balance of substantially Al, featured by having a chrysanthemum pattern structure and net-like structure formed by thickening the elements of Groups IIIa, IVa and Va around the Si particles. It is necessary that the content of the element of Group IIIa is more than those of the elements of Groups IVa and Va in the above powders as a base. The alloy powders can additionally contain the Cu, Mg, Fe, Mn, Co, W and Mo in the same amounts as mentioned above.

The sintered Al alloy of the present invention which is especially subjected to the hot working after the sintering and to the solution treatment and ageing treatment is applied to automobile parts such as a cylinder block, cylinder liner, piston, rocker arm, connecting rod, valve retainer, cylinder head, bucket, shift fork, brake drum, valve spool, and brake master cylinder, vane, rotor and Oldhamring for compressor, and guide cylinder for VTR tapes.

Especially, the present invention relates to a compressor which is provided with a fixed scroll and a turning scroll, featured in that at least one of them is composed of a sintered alloy comprising, by weight, 1–45% of Si, 0.1–20% of an element of Group IIIa, 0.01–5% of at least one element of Groups IVa and Va and the balance of substantially Al. Furthermore, the turning scroll can be made of the Al alloy and the fixed scroll can be made of a cast iron and high-speed starting can be attained by using the Al alloy for the turning scroll. This scroll is provided with a helical tooth portion on a pedestal. Especially, this scroll preferably has a tensile strength of 40–60 kg/mm² and an elongation of 1.5–10% at 150° C. and an average thermal expansion coefficient of $14-22 \times 10^{-6}/°C.$, more preferably $15-17 \times 10^{-6}/°C.$ at 20°–300° C. Also, the alloy subjected to the hot plastic working after the sintering and to the solution treatment and ageing treatment is applied to the parts as mentioned above.

The inventors have found that the reduction of the strength of conventional Al—Si—Fe, Al—Si—Mn and Al—Si—Ni based sintered alloys comprising quenched and solidified powders is due to weak interparticle binding power caused by retaining an oxide film on the surface of the particles.

Therefore, the inventors have found that the combination of an element of Group IIIa, especially Ce as rare earth element and at least one of Groups IVa and Va, especially Zr as component for enhancing interparticle binding power is most effective for improvement of strength and toughness. Thus, the present invention has been accomplished.

In the high-strength and wear resistant Al—Si based sintered alloy, Si improves wear resistance, but if the content of Si is less than 1% by weight, the effect is not enough and high strength is also not obtained. If it is more than 45% by weight, the wear resistance is high, but the compactability and plastic workability considerably deteriorate.

The alloys of the present invention can be classified into those of some stages depending on the amount of Si according to demands on strength and wear resistance. The respective Si amounts can be classified into the following stages and are employed according to the demands on strength and wear resistance. (1) 1–6%, (2) more than 6% and 12% or less, (3) more than 12% and 18% or less, (4) more than 18% and 30% or less, (5) more than 30% and 45% or less, The sintered alloy of the present invention can contain Cu, Mg, Fe, Mn, Co, W, and Mo mentioned hereinafter based on the above Si contents.

The element of Group IIIa is effective for improvement of strength, but the effect of improvement of strength is insufficient if it is contained in an amount outside the range of 0.1–20% by weight. Moreover, the total amount of Si and this element is preferably 65% by weight or less and if it exceeds 65% by weight, plastic workability of the alloy considerably deteriorates. It is preferably 0.5–10%, more preferably 1–5%.

The elements of Group IIIa include Sc, Y, lanthanide elements (La, Ce, Pr, Nd, Pm, Sm, Eu, Gd, Tb, Dy, Ho, Er, Tm, Yb, Lu) and actinide elements (Ac, Th, Pa, U, Np, Pu, Am, Cm, Bk, Cf, Es, Fm, Md, No) and at least one of them can be used. Among them, rare earth elements are especially preferred and these elements have the action to form most of Si particles in a state of very small particle size of 1 μm or less in solidification from molten state. Among the rare earth elements, it is especially preferred to use misch metal (an alloy of about 50% La and about 50% Ce) as an alloy.

It is considered that as substitutes for the elements of Group IIIa, P and alkali metals (Li, Na, K, Rb, Cs, Fr) are effective in an amount similar to that of the elements of Group IIIa.

The elements of Group IVa (Ti, Zr, Hf) and those of Group Va (V, Nb, Ta) are contained in an amount of 0.01% or more in order to form, in combination with the element of Group IIIa, fine Si particles in solidification of an Si-containing Al alloy from a molten state. However, when the amount exceeds 5%, no further increase of the effect is seen and rather ductility decreases and hence, the amount is 5% or less. Preferred is 0.1–3% and more preferred is 0.5–2%. Elements of Group IVa are preferred and Zr is especially preferred.

The combination of the element of Group IIIa and the elements of Groups IVa and Va has the effect to form fine Si particles in solidification of an Si-containing Al alloy from a molten state and besides, to inhibit growth of Si particles in a sintering step. It can provide the distribution of Si particles comprising, in the ratio of the number of particles, 50–80% of the particles of 1 μm or less in particle size, 15–30% of those of 1–2.5 μm, 5–20% of those of 2.5–5 μm and 5% or less of those of 5–10 μm. These elements are formed as a structure of chrysanthemum pattern around the Si particles which is considered to be formed as a result of thickening of these elements as alloy powders. This is considered to be cause for inhibition of growth of the Si particles in solidification and sintering and simultaneously prevent the cleavage rupture of the Si particles to enhance ductility.

It is preferred that the Si particles comprise 60–80% of those of 1 μm or less in particle size, 22–30% of those of 1–2.5 μm, 7–15% of those of 2.5–5 μm, and 2% or less of those of 5–10 μm. When the Si particles are made finer, higher ductility can be obtained and compactability is also improved. Further, there are a little amount of rupture at the Si particles by bending and hence the formed cross-section is dimpled.

The chrysanthemum pattern around Si particles of Al alloy powders is obtained by combination of the above-mentioned elements with amount of Si and is obtained when amount of the element of Group IIIa is more than that of the elements of Group IVa and Va and amount of the elements of Groups IVa and Va is 0.20% or less of the amount of Si.

In the sintered alloy of the present invention, oxygen content is markedly reduced, namely, is reduced to 0.15% or less by combination of the element of Group IIIa and the element of Groups IVa and Va and by carrying out degassing and/or sintering under vacuum or a non-oxidizing atmosphere of $2 \times 10^{-3}$ mmHg or lower in oxygen partial pressure at 350° C. or higher, whereby a high ductility can be obtained. The oxygen content may be 0.15% or less and is preferably 0.10% or less, more preferably 0.05% or less.

The above aluminum powder alloy is produced by air and nitrogen or argon gas atomizing method. In case of the alloy component being supersaturatedly added, Si particles become coarse to give adverse effects on strength and wear resistance and so, the atomizing method is proper for finely dispersing the Si particles. Such aluminum powder alloy is compression compacted into a billet by cold isostatic pressing (CIP) and this billet is subjected to solid-phase sintering under vacuum or in an inert gas such as nitrogen or argon, preferably at 460°–500° C. to carry out densification. However, even if the powder alloy is subjected to solid-phase sintering, voids remain inside the alloy the result in internal defects. Therefore, preferably the sintered alloy is densified by carrying out repressing by hot compact compression at 250°–450° C. under 4.5 ton/cm² or higher, especially preferably 5–9 ton/cm². The sintered alloy obtained through such production steps becomes from a metastable precipitate in which solid solution is formed in supersaturated state to a stable precipitate or an intermetallic compound and even when it undergoes thermal history of lower than the heating temperature of the repressing, the precipitate does not again form solid solution or does not reprecipitate and so straining deformation occurs with difficulty. However, for obtaining the higher strength, the sintered alloy is subjected to solution treatment which comprises heating the alloy at 400°–520° C. and then cooling it with water and then to aging treatment at 100°–200° C., especially 150°–200° C., whereby higher strength can be attained. The ageing treatment is preferably carried out for the alloy containing Cu and Mg.

The alloy powders of the present invention is especially preferably those solidified at a cooling rate of 50° C./sec or higher. The particle size of the powders is preferably 350 meshes or less, especially 30 μm or less.

The compacting before sintering is carried out preferably under 2.5 ton/cm² or higher, especially preferably under 3–5 ton/cm².

Cu and Mg are added respectively in an amount of 0.1% or more as age-hardening elements which precipitate a intermetallic compound by aging treatment to improve strength of matrix. On the other hand, if the amount exceeds 5%, toughness is lowered and so the amount of each of them should be 5% or less. Therefore, addition of Cu in an amount of 0.1–5% by weight and Mg in an amount of 0.1–5% by weight most highly increases the hardness of matrix and improves the strength. Especially preferred is 2–5% Cu and 0.1–1% Mg. When the oxygen content in the alloy is 0.15% or less, Cu can be contained in an amount of up to 10%.

Moreover, the alloy of the present invention which contains Cu and Mg can additionally contain at least one of 2.0% or less of Fe, 1.5% or less of Mn and 1.5% or less of Co. These elements produce intermetallic compounds with Al to improve strength and heat resistance of the alloy. However, each of these elements is preferably in an amount of 0.01% or more and if each of them is contained in an amount of more than the upper limit, strength of alloy decreases and the alloy becomes brittle.

Besides, the alloy of the present invention when the oxygen content is 0.15% or less can contain 20% or less of Fe, 10% or less of Mn, 8% or less of Co, 5% or less of W and 5% or less of Mo and the total amount of these elements is preferably at most 20%. Especially preferred are 5–13% Fe, 2–5% Mn, 0.5–3% Co, 1–3% W, and 1–3% Mo.

The present invention relates to a scroll for compressor provided with a helical tooth portion on a pedestal, characterized in that said tooth portion is formed nearly perpendicularly to said pedestal and the curvature of the base portion or root on the pedestal and that of angular portion of the end or edge of the tooth portion are 0.1–0.5 mm and elongation at room temperature is 1% or more. Especially, by using a sintered Al alloy of hyper-eutectic Si or 2% or more in elongation, thickness of the tooth portion can be 1–5 mm and can be 0.015–0.05 mm per 1 mm of the outer diameter of the scroll. Additionally, the thickness of the tooth portion can be 0.1–0.25 mm per 1 mm of the height of the tooth portion. Especially preferred is a thickness of 0.02–0.04 mm per 1 mm of the outer diameter. The height of the tooth portion is preferably 0.1–0.3 mm, especially preferably 0.15–0.25 mm per 1 mm of the outer diameter of the scroll.

EXAMPLE 1

TABLE 1

| No. | Si | Ce | Cu | Mg | Fe | Mn | Zr | Co | Al |
|---|---|---|---|---|---|---|---|---|---|
| 1 | 10 | 1 | — | — | — | — | — | — | balance |
| 2 | 25 | 1 | — | — | — | — | — | — | " |
| 3 | 45 | 1 | — | — | — | — | — | — | " |
| 4 | 10 | 5 | — | — | — | — | — | — | " |
| 5 | 25 | 5 | — | — | — | — | — | — | " |
| 6 | 45 | 5 | — | — | — | — | — | — | " |
| 7 | 10 | 10 | — | — | — | — | — | — | " |
| 8 | 25 | 10 | — | — | — | — | — | — | " |
| 9 | 45 | 10 | — | — | — | — | — | — | " |
| 10 | 10 | 20 | — | — | — | — | — | — | " |
| 11 | 25 | 20 | — | — | — | — | — | — | " |
| 12 | 45 | 20 | — | — | — | — | — | — | " |
| 13 | 15 | 5 | 3.5 | 0.5 | — | — | — | — | " |
| 14 | 25 | 5 | 3.5 | 0.5 | — | — | — | — | " |
| 15 | 45 | 5 | 3.5 | 0.5 | — | — | — | — | " |
| 16 | 25 | 5 | 3.5 | 0.5 | 0.5 | 0.5 | 1 | — | " |
| 17 | 25 | 5 | 3.5 | 0.5 | 0.5 | 0.5 | 1 | 0.5 | " |
| 18 | 45 | 5 | 3.5 | 0.5 | 0.5 | 0.5 | 1 | — | " |
| 19 | 25 | — | — | — | 5 | — | — | — | " |
| 20 | 25 | — | — | — | — | 10 | — | — | " |
| 21 | 25 | — | 4 | 1 | — | — | — | — | " |
| 22 | 25 | — | — | — | — | — | — | 5 | " |
| 23 | 45 | — | 4 | 1 | 5 | — | — | 5 | " |

Table 1 shows chemical compositions (% by weight) in Examples and Comparative Examples. The powders were prepared by rapidly cooling molten metal by gas atomizing method using air. The particle size of the powders was 350 meshes or less. The present alloy Nos. 1–18 and comparative alloy Nos. 19–23 were prepared by compacting the powders of the respective components by cold isostatic pressing method (CIP) under a pressure of 3.6 ton/cm$^2$ and sintering the compacting at a sintering temperature of 480° C. for a sintering time of 120 minutes. After sintering, the compacting was subjected to the represssing at 350° C. under 7 ton/cm$^2$ and then subjected to the solution treatment by keeping it at 490° C. for 30 minutes and then cooling it with water. Thereafter, aging treatment was carried out at 160° C. for 20 hours. The sintering was effected under a vacuum of 10$^{-3}$ mmHg.

TABLE 2

| No. | Tensile strength (kg/mm$^2$) | Bending strength (kg/mm$^2$) | Impact strength (kg-m/cm$^2$) | Critical seizing surface pressure (kg/cm$^2$) |
|---|---|---|---|---|
| 1 | 46 | 92 | 0.84 | 175 |
| 2 | 43 | 90 | 0.82 | 218 |
| 3 | 40 | 72 | 0.51 | 238 |
| 4 | 52 | 108 | 0.98 | 185 |
| 5 | 50 | 102 | 0.92 | 235 |
| 6 | 41 | 71 | 0.53 | 260 |
| 7 | 49 | 98 | 0.87 | 188 |
| 8 | 47 | 96 | 0.82 | 237 |
| 9 | 42 | 70 | 0.49 | 275 |
| 10 | 48 | 97 | 0.86 | 200 |
| 11 | 46 | 95 | 0.83 | 263 |
| 12 | 35 | 65 | 0.42 | 285 |
| 13 | 49 | 101 | 0.97 | 212 |
| 14 | 48 | 100 | 0.95 | 275 |
| 15 | 40 | 71 | 0.47 | — |
| 16 | 52 | 106 | 0.98 | 218 |
| 17 | 50 | 103 | 0.96 | 288 |
| 18 | 43 | 61 | 0.38 | 295 |
| 19 | 41 | 65 | 0.20 | 199 |
| 20 | 42 | 70 | 0.21 | 189 |
| 21 | 43 | 72 | 0.39 | 213 |
| 22 | 39 | 65 | 0.21 | 202 |
| 23 | 32 | 55 | 0.19 | 230 |

As shown in Table 2, each of the thus obtained sintered alloys was worked into test pieces for tensile test, bending test (thickness: 5 mm, width: 20 mm, length: 40 mm) and impact test, which were subjected to tensile test, three-point bending test, and 5 kg Charpy impact test. As is clear from the results, the Al—Si—Ce sintered alloys of the present invention had tensile strength equal to or higher than that of the comparative alloys. Especially, impact strength of the alloys of the present invention was 0.82 kg-m/cm$^2$ or higher while that of the comparative alloys was 0.39 kg-m/cm$^2$ and bending strength of the former was 90 kg/mm$^2$ or higher while that of the latter was 72 kg/mm$^2$ when comparison was made on alloys of 25% Si.

Furthermore, critical seizing surface pressure was obtained on the above sintered alloys. Frictional conditions were as follows: Opposite material was flake graphite cast iron (FC25) and atmosphere was refrigerating machine oil (mixture of lubricating oil and refrigerant). As is clear from the results, when comparison was made on the present alloy Nos. 2, 5, 8, 11, 14, 16 and 17 with the comparative alloy Nos. 19, 20, 21 and 22 which contained 25% of Si, the critical seizing surface pressure of the alloys of the present invention was 218 kg/cm$^2$ or more which was higher than that of all comparative alloys.

FIGS. 1–4 show the production method and characteristics of the present alloy, No. 16 shown in Table 1. Powders used were the same as above. FIG. 1 shows bending strength and density of the product obtained when the condition in compacting step was changed from 1 to 5 tons/cm$^2$ in the production steps of compacting→sintering (480° C.×120 minutes)→ repressing (350° C., 7 tons/cm$^2$)→heat treatment (490° C.× 30 minutes and water cooling→160° C.×20 hours aging treatment). When the compacting pressure was 2 tons/cm$^2$ or lower, bending strength and density did not increase in the subsequent production steps. Furthermore, bending strength and density became highest by increasing the compacting pressure to 3.5 tons/cm$^2$ or higher and thus, the compacting pressure of 3.5 tons/cm$^2$ or higher is preferred.

Figure 2:
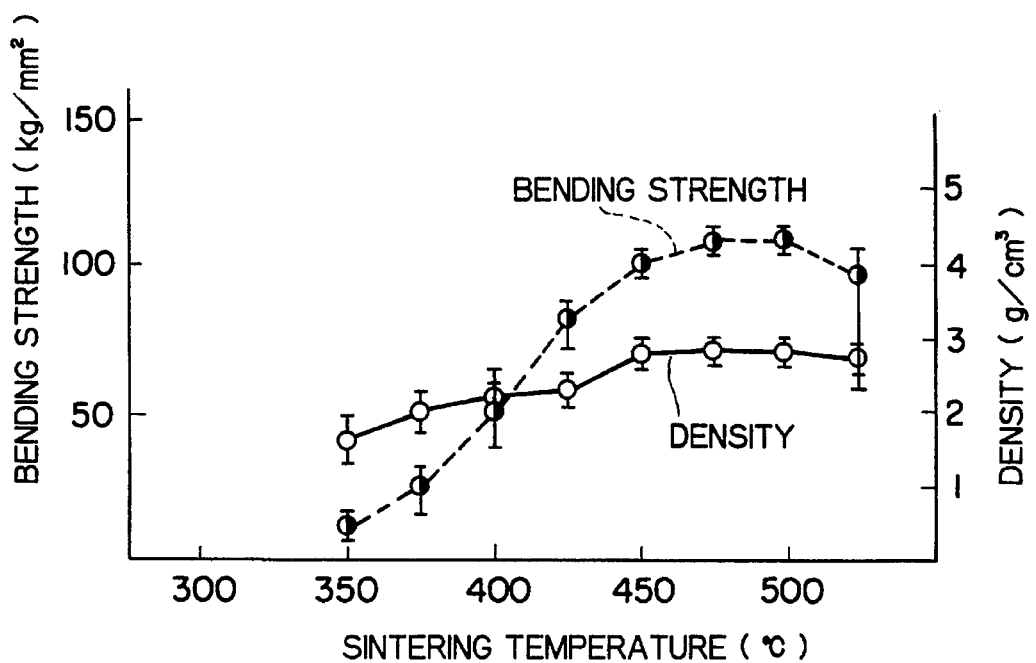
FIG. 2 is a graph which shows relations between sintering temperature and bending strength and density for the alloy of the present invention.

FIG. 2 shows the bending strength and density when the sintering temperature was changed from 350° C. to 525° C. in the production steps of compacting (3.6 tons/cm$^2$)→ sintering→repressing 350° C., 7 tons/cm$^2$)→ heat treatment (498° C.×30 minutes and water cooling→ 160° C.×20 hours aging). When the sintering temperature was 400° C. or lower, the alloy is low in strength and density and was low in reliability and thus, the sintering temperature is preferably higher than that temperature. When the sintering temperature was higher than 525° C., strength and density slightly decrease.

Figure 3:
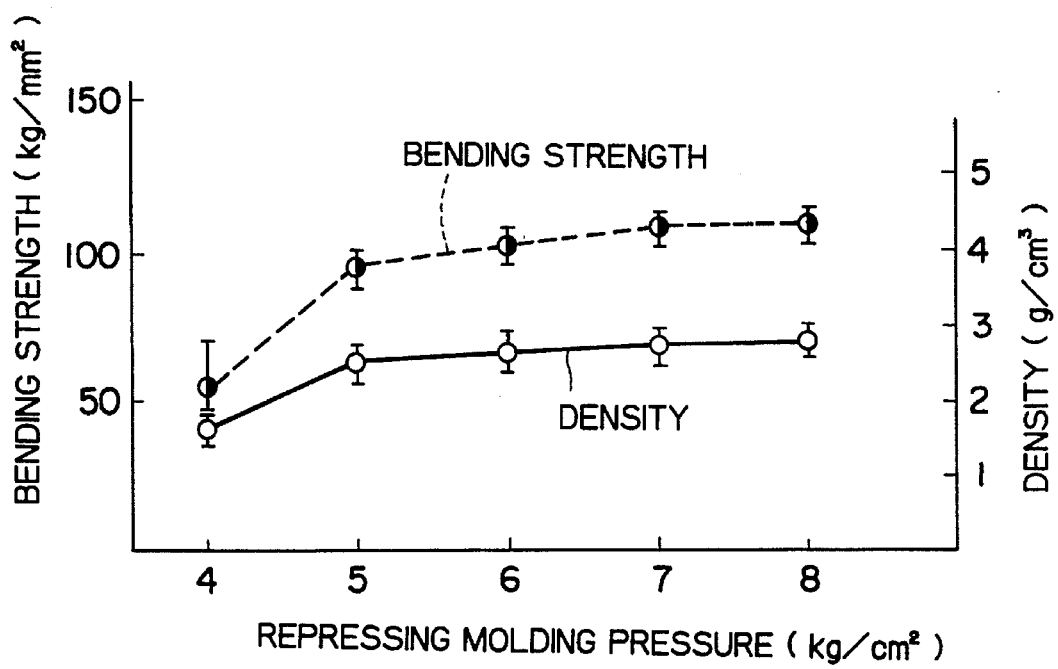
FIG. 3 is a graph which shows relations between repressing compacting pressure and bending strength and density for the alloy of the present invention.

FIG. 3 shows the bending strength and density when the pressure in repressing was changed from 4 to 8 tons/cm$^2$ in the production steps of compacting (3.6 ton/cm$^2$)→sintering (480° C.×120 min)→repressing→ heat treating (490° C.×30 minutes and water cooling→ 160° C.×20 hours aging). When the pressure of repressing was lower than 5 ton/cm$^2$, bending strength and density were low and the higher pressure is preferred. When it was higher than 7 ton/cm$^2$, higher improvements are not obtained, but the bending strength and density were nearly constant and stable and hence, a pressure higher than 7 ton/cm² is preferred.

Figure 4:
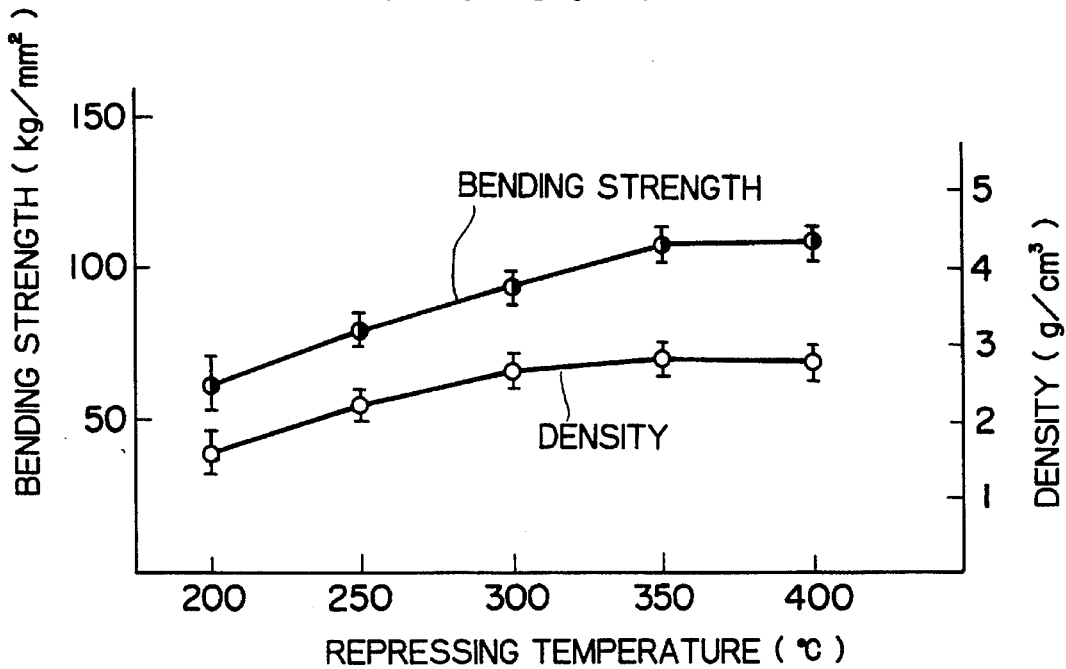
FIG. 4 is a graph which shows relations between repressing temperature and bending strength and density for the alloy of the present invention.

FIG. 4 shows the bending strength and density when the temperature in repressing was changed from 200° to 400° C. in the production steps of compacting (3.6 ton/cm²)→ sintering (480° C.×120 minutes)→repressing (7 ton/cm²)→ heat treatment (490° C.×30 minutes and water cooling→ 160° C.×20 hours aging). Bending strength and density linearly increase with increase from 200° C. to 350° C. in repressing temperature. Especially, bending strength and density were stable and stable properties were obtained. Therefore, a temperature of higher than 350° C. is preferred for repressing.

EXAMPLE 2

TABLE 3

| No. | Si | Cu | Mg | Zr | Fe | Ce | Al |
|---|---|---|---|---|---|---|---|
| 24 | 20.8 | 5.2 | 0.8 | 0.9 | 0.5 | 1.0 | balance |
| 25 | 24.4 | 3.7 | 0.8 | 1.0 | 0.5 | 0.5 | " |
| 26 | 25.1 | 3.4 | 0.8 | 0.9 | 0.5 | 1.0 | " |
| 27 | 24.9 | 3.6 | 0.8 | 0.9 | 0.4 | 2.0 | " |

Alloy powders as shown in Table 3 were prepared by the gas atomizing method as in Example 1. Si particles in these alloy powders were nearly the same as in example 1. Alloys were prepared using these alloy powders under the same conditions as in those of Table 2 in Example 1. The particle size distribution of the Al alloy powders was that those of 45 μm or less occupied 50% or higher, those of more than 45 μm and 150 μm or less occupied 45% or less and those of up to 200 μm occupied the remainder of 5% or less. Those of 50, 60, 100 and 150 μm in particle size occupied 5–12%, respectively.

TABLE 4

| Particle size of Si particles (μm) | | Proportion of the number of particles (%) | |
|---|---|---|---|
| 1 μm or less | 0.1 | 26.0 | 60 |
|  | 0.5 | 17.5 |  |
|  | 0.9 | 16.5 |  |
| More than 1 μm and 2.5 μm or less | 1.3 | 11.0 | 27.5 |
|  | 1.7 | 9.5 |  |
|  | 2.1 | 7.0 |  |
|  | 2.5 | 2.0 |  |
| More than 2.5 μm and 5 μm or less | 2.9 | 2.5 | 11.5 |
|  | 3.3 | 3.0 |  |
|  | 3.7 | 2.5 |  |
|  | 4.1 | 0.5 |  |
|  | 4.5 | 0.5 |  |
|  | 4.9 | 0.5 |  |
| More than 5 μm | 5.6 | 0.5 | 1.0 |
|  | 7.6 | 0.5 |  |

Table 4 shows the particle size distribution of Si particles of the alloy No. 27. The particle sizes of Si particles shown in the table were obtained by measuring the size of totally 200 Si particles and the relation between size and number was examined. The Si particles of 1 μm or less occupied 60% and those of 2.5 μm or less occupied 87.5% and thus, the Si particles were very fine.

The oxygen content of alloys of Nos. 24–27 was examined to find 0.05–0.1% and alloys of a very low oxygen content were obtained by combination of the element of Group IIIa with those of Groups IVa and Va and with sintering under vacuum.

TABLE 5

| | Tensile strength (kg/mm²) | | Elongation (%) | | Bending | |
|---|---|---|---|---|---|---|
| No. | Room temp. | 150° C. | Room temp. | 150° C. | strength (Kgf/mm²) | α (×10⁶/°C.) |
| 24 | 48 | 41 | 0.4 | 2.4 | 82 | 18.2 |
| 25 | 50 | 43 | 0.4 | 2.4 | 66 | 17.4 |
| 26 | 47 | 40 | 0.4 | 2.0 | 80 | 17.4 |
| 27 | 57 | 49 | 0.5 | 3.0 | 98 | 17.3 |

Table 5 shows the tensile strength, elongation and bending strength of the resulting alloys at room temperature and 150° C. and thermal expansion coefficient at room temperature—200° C. The tensile strength of the alloys of the present invention was 47 kg/mm² or higher at room temperature and 40 kg/mm² or higher at 150° C. and elongation was 0.4–0.5% and 2.0–3.0%, respectively and were all higher than those of conventional alloys.

Figure 5:
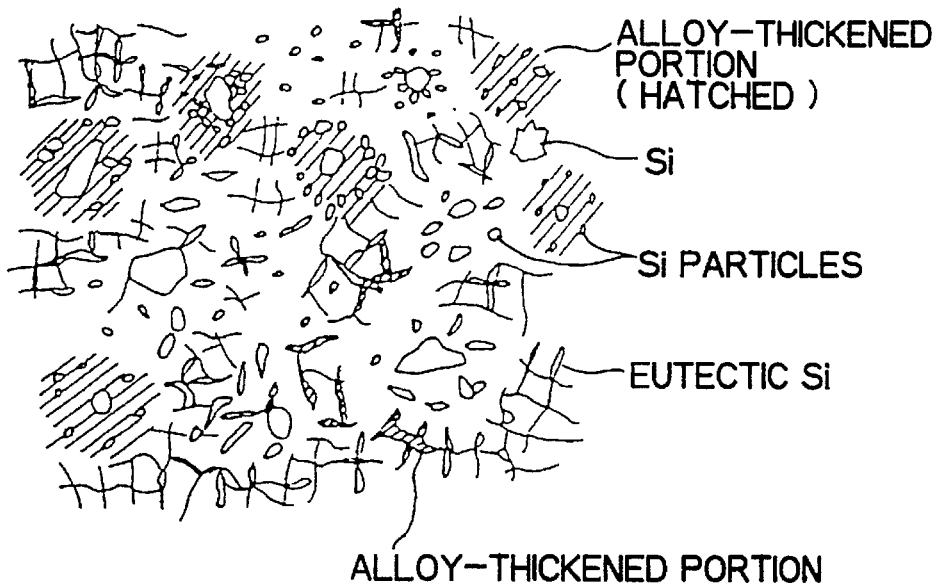
FIG. 5 shows the structure of the Al alloy powders of the present invention.

FIG. 5 snows results of tracing of microphotograph (×850) of section of atomized powders of No. 26. As shown in FIG. 5, structures of chrysanthemum pattern (the hatched portion) where Cu, Mg, Fe, Ce and Zr were thickened were formed around Si particles in the atomized powders of the present invention. Si particles were very finely formed by containing Ce and Zr and Si particles were finely kept also in sintering and repressing at high temperatures. Si particles of 2.5 μm or more in particle size occupied 80% or more, those of 5 μm or less occupied 95% or more and those of 10 μm or less occupied 99% or more of the total Si particles in the powders. Individual Si particles may gather and may be seen in the form of large particles, but individual particles are 10 μm or less as mentioned above. The relatively large particles are proeutectic Si. Fine particles, narrow particles and cotton-like particles are eutectic Si. Structures formed by thickening of Cu, Mg, Fe, Ce and Zr were also partially formed in the form of narrow particles around the eutectic Si. The eutectic Si and the thickened structure were formed in a net-like form. The thickened portions in the narrow particle form are indicated by oblique lines.

Figure 6:
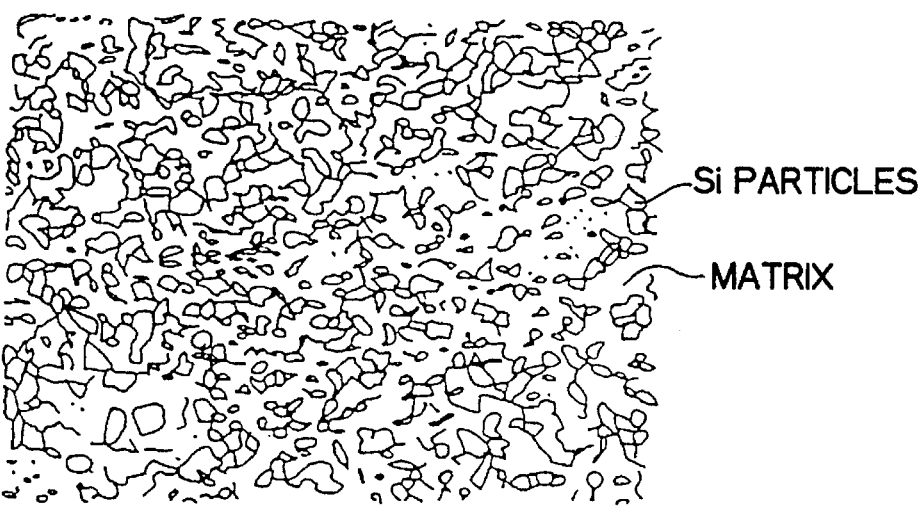
FIG. 6 shows the structure of the sintered Al alloy of the present invention.

FIG. 6 shows results of tracing a microphotograph (×1200) of the alloy of No. 26 subjected to repressing after the sintering under vacuum and thereafter, subjected to heat treatment. Particles observed in the photograph were Si particles and an intermetallic compound was formed with two or three or more of Al, Si, Cu, Mg, Fe, Ce and Zr by aging treatment, but this cannot be seen in optical structure. The distribution of Si particles was nearly the same as that of No. 27 mentioned above, but Si particles were formed in somewhat larger size. The structure as sintered under vacuum was nearly the same as shown in FIG. 6 in distribution and size of Si particles except that intermetallic compound was not formed.

EXAMPLE 3

The alloy powders which corresponded to No. 24 in Example 2 except that one of Ti, Hf and Nb was contained in place of Zr in the same amount as that of Zr and one of Y and Sm was contained in place of Ce in the same amount as that of Ce with respect to each of Ti, Hf and Nb were prepared in the same manner as in Example 2 and subjected to the sintering, repressing, solution treatment and aging treatment under the same conditions as in Example 2.

These alloys were subjected to the tensile test at 150° C. to obtain a tensile strength of 37–43 kg/mm$^2$ and an elongation of 1.5–3.0%.

The microstructure of the alloy powders was observed to find that chrysanthemum patterns were formed around the Si particles as above. It is considered that the alloy phases of these elements were formed. The number of the Si particles having a particle size of 2.5 µm or less occupied at least 80% of the total Si particles and the particle size was at most 10 µm.

The final products obtained had also nearly the same distribution of the Si particles as mentioned above.

Actinide elements have the same action as rare earth elements.

EXAMPLE 4

Figure 7:
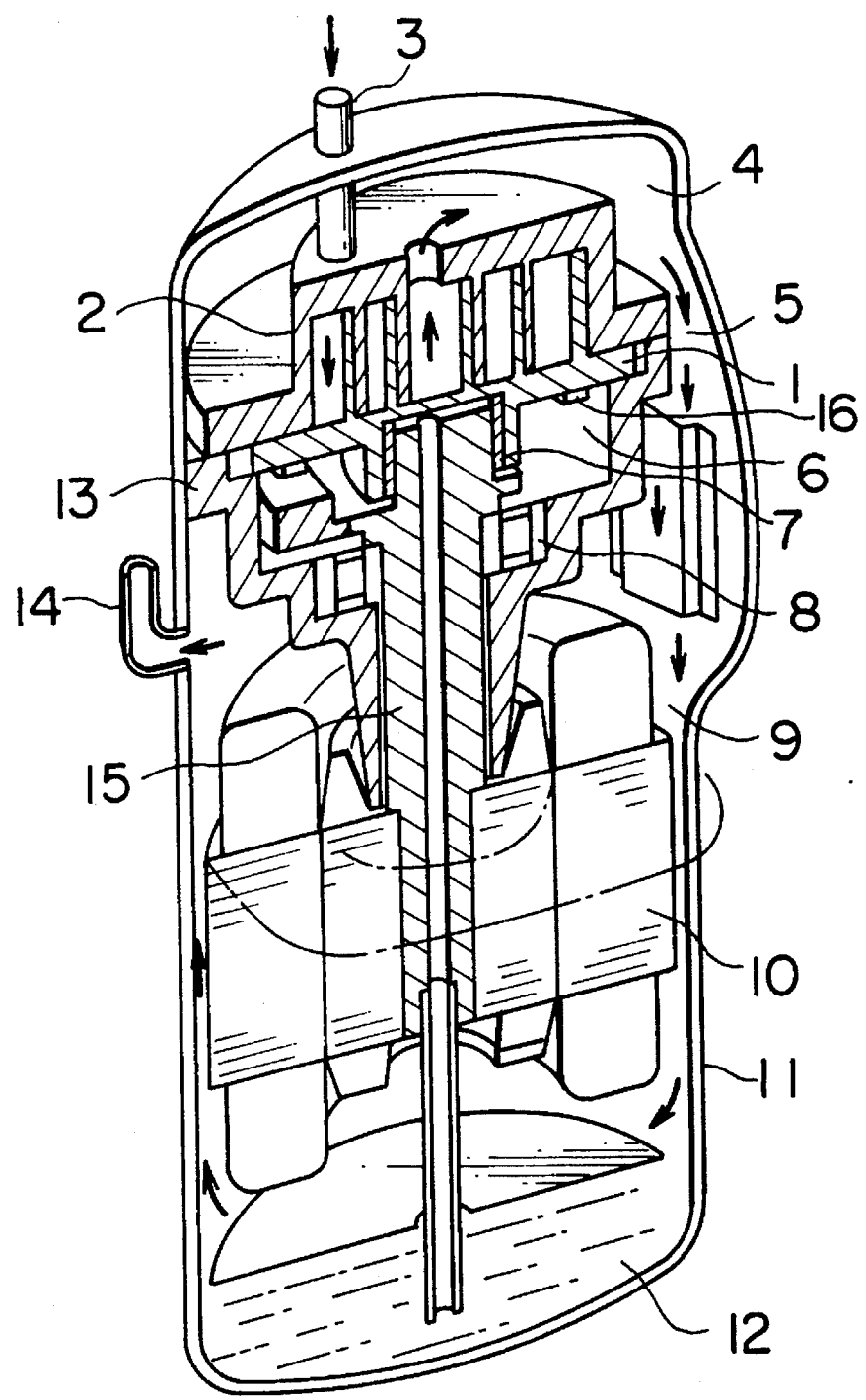
FIG. 7 is a perspective cross-sectional view of a partial section of a closed scroll compressor according to the present invention.

FIG. 7 is an oblique view of a partial section of a closed scroll compressor. This compressor comprises mainly turning scroll 1, fixed scroll 2, suction pipe 3, discharge chamber 4, discharge passage 5, intermediate pressure chamber 6, turning bearing 8, motor chamber 9, motor 10, chamber 11, refrigerating machine oil 12, frame 13, discharge pipe 14, crankshaft 15 and Oldhamring 16. This compressor is for domestic or business use. A scroll of 80–130 mm in diameter is used for domestic purpose and that of 200–300 mm in diameter is used for business purpose.

Figure 9:
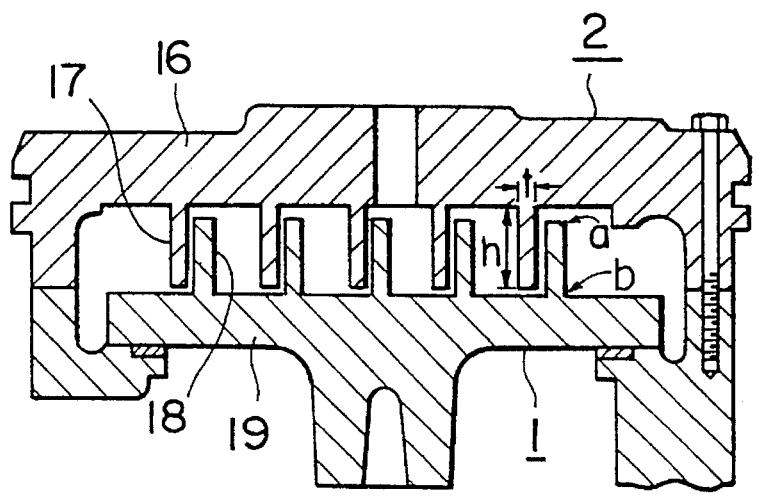
FIG. 9 is a cross-sectional view of a scroll compressor for car air conditioners according to the present invention.

The turning scroll 1 and fixed scroll 2 shown in FIG. 9 were made of the alloy of No. 27 in Example 2. The numbers 16 and 19 indicate pedestals and 17 and 18 indicate tooth portions. First, sintering was similarly carried out and the resulting sintered material was molded by a mold at 350° C. The height (h) of the tooth was 15 mm and thickness (t) of the tooth was 2.7 mm. The diameter of the turning scroll was about 80 mm and the tooth portion was nearly straight with no taper. The curvature of the root portion (b) of the tooth was 0.5 mm. The curvature of the edge portion of the tooth is designated by (a). The molded article was then similarly subjected to the solution treatment (490° C.×30 minutes and water cooling) and aging treatment (160° C.×20 hours) and thereafter finished by mechanical working. The fixed scroll was somewhat larger than the turning scroll and these were allowed to contact with each other at a slight gap by rotation to cause sliding. The curvature of the root portion of the tooth in the fixed scroll was also 0.5 mm. The gap was 10–20 µm. The thickness of the tooth portion was 0.034 mm per 1 mm of outer diameter and 0.18 mm per 1 mm of the height of the tooth portion. The height of the tooth portion was 0.19 mm per 1 mm of outer diameter of the scroll.

When the sintered alloy of the present invention was used, compactability at high temperatures was extremely superior and the whole tooth portion could be compacted with good swelling at the central portion in the tooth portion of the scroll. The particle size distribution of the Si particles was the same as above. Since ductility of the alloy of the present invention was high, there occurred no problems even if the curvature of the rising portion of the tooth portion was small and as a result, it was found that compression of high efficiency was obtained. An intermetallic compound could not be distinctly identified by a microscope. Especially, when it was used in room air conditioners, rapid starting was possible by using an inverter and warm air could be discharged in 3 minutes.

EXAMPLE 5

Figure 8:
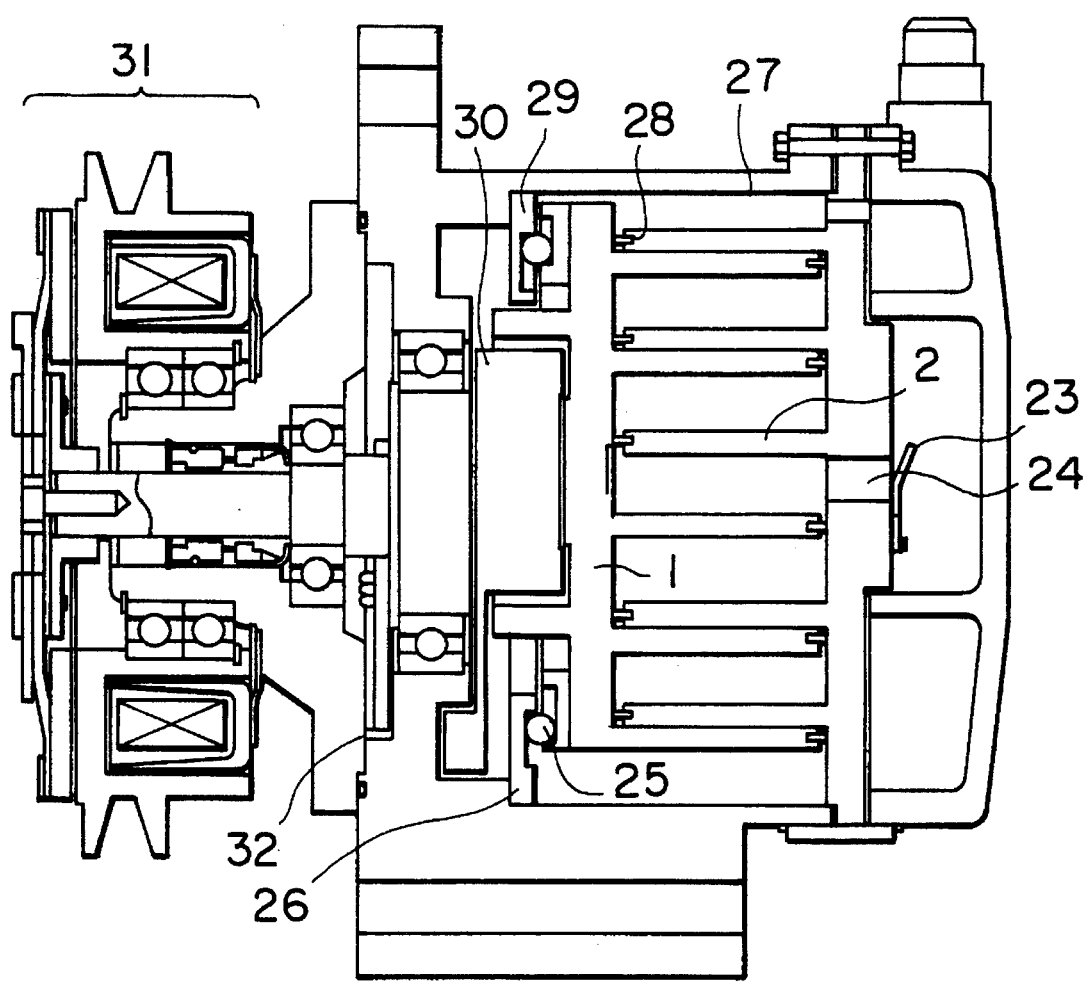
FIG. 8 is a cross-sectional view of a scroll for closed scroll compressors according to the present invention.

FIG. 8 is a cross-sectional view of a scroll compressor for car air conditioners. This compressor comprises mainly turning scroll 1, fixed scroll 2, discharge valve 23, discharge opening 24, bearing ball 25, rotation inhibitor 26, suction opening 27, chip seal 28, ring 29, sliding clutch 30, magnetic clutch 31 and balanced weight 32.

Figure 10:
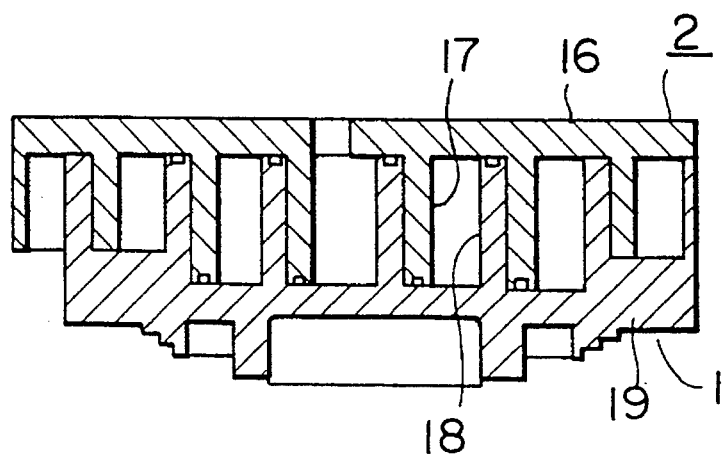
FIG. 10 is a cross-sectional view of a scroll for scroll compressors for car air conditioners according to the present invention.

Turning scroll 1 and fixed scroll 2 shown in FIG. 10 were made of the alloy of No. 27 in Example 2. The production conditions were the same as in Example 4. The height of the tooth of the scroll was 15 mm and the thickness was 2.7 mm and the curvature of the root portion of the tooth was 0.5 mm. Thus, the tooth was straight.

By using the alloy of the present invention, compactability in a mold was high and a scroll in conformity with the profile of the mold as a whole was obtained. The particle size distribution of the Si particles and the intermetallic compounds were the same as aforementioned.

The compressor was actually driven to obtain compression of high efficiency.

The present invention can provide Al—Si based sintered alloys high in strength and excellent in the high-temperature ductility. Therefore, it has become possible to use the alloys for members to which impact and high load are applied and for which conventional Al— Si—Fe based sintered alloys cannot be used.

What is claimed is:

1. A scroll for compressors which is provided with a helical tooth portion on a pedestal, wherein the tooth portion is composed of a hyper-eutectoid Si-containing sintered Al alloy having a tensile strength of 40–60 kg/mm$^2$, an elongation of 1.5–10% at 150° C. and an average thermal expansion coefficient of 16–22×10$^{-6}$/°C. at 20°–300° C. and is formed nearly perpendicularly to the pedestal, and the curvatures of the root portion on the pedestal and that of the edge portion of the end of the tooth portion are 0.1–0.5 mm.

2. A scroll for compressors which are provided with a helical tooth portion on a pedestal, wherein the tooth portion is composed of a hyper-eutectoid Si-containing sintered Al alloy having a tensile strength of 40–60 kg/mm$^2$, an elongation of 1.5–10% at 150° C. and an average thermal expansion coefficient of 16–22×10$^{-6}$/°C. at 20°–300° C., and is formed nearly perpendicularly to the pedestal, and the thickness of the tooth portion is 0.1–0.25 mm per 1 mm of the height of the tooth portion.

* * * * *